United States Patent [19]

Greinke et al.

[11] Patent Number: 4,895,713

[45] Date of Patent: Jan. 23, 1990

[54] INTERCALATION OF GRAPHITE

[75] Inventors: Ronald A. Greinke, Medina; Robert A. Mercuri, Seven Hills; Edgar J. Beck, Fairview Park, all of Ohio

[73] Assignee: Union Carbide Corporation, Danbury, Conn.

[21] Appl. No.: 323,214

[22] Filed: Mar. 16, 1989

Related U.S. Application Data

[63] Continuation of Ser. No. 91,195, Aug. 31, 1987, abandoned.

[51] Int. Cl.$^4$ .............................................. C01B 31/04
[52] U.S. Cl. .................. 423/448; 423/415 R; 423/460; 252/502
[58] Field of Search ............... 423/415 R, 448, 460; 252/502

[56] References Cited

U.S. PATENT DOCUMENTS

| | | | |
|---|---|---|---|
| 3,404,061 | 10/1968 | Shane et al. ........................ 161/125 |
| 3,719,608 | 3/1973 | Olstowski ........................... 423/448 |
| 3,885,007 | 5/1975 | Olsen et al. ........................ 423/460 |
| 4,091,083 | 5/1978 | Hirschvogel et al. .......... 423/415 R |
| 4,146,401 | 3/1979 | Yamada et al. .................... 423/460 |
| 4,199,628 | 4/1980 | Caines ............................... 423/448 |
| 4,244,934 | 7/1981 | Konodo et al. .................... 423/448 |
| 4,265,952 | 5/1981 | Caines ............................... 423/448 |

FOREIGN PATENT DOCUMENTS

| | | | |
|---|---|---|---|
| 59-13613 | 1/1984 | Japan ................................. 423/448 |
| 59-169916 | 9/1984 | Japan ................................. 423/448 |
| 2077246 | 12/1981 | United Kingdom ............... 423/448 |
| 2128971 | 5/1984 | United Kingdom ............... 423/448 |

*Primary Examiner*—Gary P. Straub
*Assistant Examiner*—Robert M. Kunemund
*Attorney, Agent, or Firm*—E. Lieberstein

[57] ABSTRACT

A method for intercalating graphite flakes which requires less intercalation solution and avoids a washing step, thus producing economy in material and production costs, and avoiding production of contaminated waste water which requires costly disposal steps.

18 Claims, No Drawings

INTERCALATION OF GRAPHITE

This application is a continuation of prior U.S. application Ser. No. 091,195, filed Aug. 31, 1987, now abandoned.

FIELD OF THE INVENTION

The present invention relates to a method of intercalating graphite flakes. Intercalated graphite flakes are used in the manufacture of flexible graphite foil by exfoliating the intercalated graphite flakes and then compressing the exfoliated graphite into a flexible foil.

BACKGROUND OF THE INVENTION

Graphite is a crystalline form of carbon comprising atoms bonded in flat planes, with weaker bonds between the planes. A useful form of graphite is a flexible sheet or foil. Because of graphite's stability at high temperatures, flexible graphite foil is useful in high temperature applications as, for example, gaskets and valve packings, and is often used as a replacement for asbestos gasket materials.

Flexible graphite is made by first treating graphite flakes with substances that intercalate into the crystal structure of the graphite and react to form a compound of graphite and the intercalant. Upon heating at a high temperature, the intercalants in the graphite crystal form a gas, which causes the layers of the graphite to separate, and the graphite flakes to expand or exfoliate in an accordion-like fashion in the c-direction, i.e. the direction perpendicular to the crystalline planes of the graphite. The exfoliated graphite flakes are vermiform in appearance, and are therefore commonly referred to as worms. The worms are then compressed together into sheets. Unlike the original graphite flakes, the sheets are flexible and can be formed and cut into various shapes.

A common method for manufacturing flexible graphite foil is described by Shane et al. in U.S. Pat. No. 3,404,061. In the typical practice of the Shane et al. method, natural graphite flakes are intercalated by dispersing the flakes in a large excess of a solution containing an oxidizing agent, such as a solution of sulfuric acid and nitric acid, after which the excess solution is drained from the flakes. The quantity of intercalation solution retained on the flakes after draining is typically greater than 100 parts of solution by weight per 100 parts by weight of graphite flakes (pph), more typically about 150 to 200 pph.

Of the intercalation solution retained on the flakes after draining, only a fraction actually reacts with the graphite. This excess portion of the solution is generally removed by washing the flakes with water. This eases handling of the intercalated flakes and helps prevent degradation of the graphite from excess oxidant in the solution.

After washing with water, the intercalated graphite flakes are dried and then exfoliated by exposing them to a flame for a few seconds at temperatures greater than 700° C., more typically 1000° C. or higher. The exfoliated graphite flakes or worms are then compressed and rolled into flexible graphite sheets.

Hirschvogel et al. in U.S. Pat. No. 4,091,083 disclose a method for forming intercalated graphite which comprises dispersing graphite particles in sulfuric acid, and adding hydrogen peroxide while maintaining the graphite particles in a dispersed state. 100 to 200 parts of sulfuric acid/hydrogen peroxide solution are used for 100 parts of graphite flakes. After graphite is intercalated the graphite is separated from the solution and washed to remove excess residual acid.

A problem with these prior art methods is that they inefficiently utilize the intercalation solutions. At least four times as much solution is retained on the graphite flakes as reacts with the graphite to form an intercalated graphite compound. The excess solution remains on the surface of the flakes, and must be removed by washing the flakes with water. This causes a significant waste disposal problem, since the acid washed from the intercalated graphite must be neutralized before disposition in the sewage system. The neutralization step is costly. Therefore, a method avoiding production of an acid waste wash solution would be desirable.

An additional environmental problem occurs when phosphate compounds are used in the intercalation solution, as disclosed, for example, in United States patents 4,146,401 and 4,400,433. In these methods, phosphate compounds are used to impart oxidation resistance to compressed exfoliated graphite foil, by intercalating graphite flakes with phosphates in addition to other intercalating agents. When the graphite flakes are washed after intercalation, approximately 80% of the phosphate retained on the flakes is unreacted and must be washed off and disposed of. Phosphate ions are environmental contaminants, and their discharge into the environment is restricted. It would therefore be desirable to produce an oxidation resistant graphite product which minimizes the production of phosphate containing waste water.

Another problem associated with prior art methods is that the volume to which intercalated graphite flakes exfoliate decreases with the age of the intercalated graphite, even when the flakes are washed and dried. This occurs if the flakes have a high ash content (greater than about 1 wt. %) and have been intercalated by a process which leaves residual oxidant on the flakes, as, for example, with the nitric acid/sulfuric acid system. This aging of the intercalated flakes requires adjustments in the manufacture of flexible graphite and generally leads to decreased uniformity in area/weight of the flexible graphite foil. The age-deterioration of exfoliated flake volume also is detrimental to the strength properties of the graphite foil, and eventually the exfoliated flake volume may deteriorate to a point that acceptable graphite foil cannot be produced. It would therefore be desirable to produce intercalated graphite by a method which minimizes the problem of deterioration due to aging.

OBJECTS OF THE INVENTION

An object of the invention, therefore, is a method for intercalating graphite which requires a reduced quantity of intercalation solution, such that a minimum of excess solution is retained upon the graphite flakes.

Another object of the invention is to provide a method for intercalation of graphite which eliminates the need for a washing step to rinse off the excess intercalation solution.

Another object of the invention is to provide a method for treating graphite flakes with phosphates to increase the oxidation resistance of flexible graphite foil, but which produces no phosphate-containing wash solution.

Another object of the invention is to provide a phosphate-free method for increasing the oxidation resistance of flexible graphite foil produced from the intercalated graphite.

Another object of the invention is to provide a method for making high ash intercalated graphite flakes that do not deteriorate during storage.

Other objects of the invention will be evident from the description of the invention that follows.

SUMMARY OF THE INVENTION

One embodiment of the present invention is a method for intercalating graphite flakes which comprises;

(a) adding liquid intercalation solution to graphite flakes in an amount of between 10 and 50 parts by weight of solution per 100 parts by weight of graphite flakes, and (b) dispersing the intercalation solution throughout the graphite flakes, whereby producing intercalated graphite flakes having an exfoliation volume greater than 100 cm$^3$/g.

As used in the present specification and claims, "intercalation solution" is a solution which reacts with graphite flakes to form an intercalated compound of graphite and an intercalant by an interlayer inclusion of intercalants in the graphite crystal.

As used in the present specification and claims, "exfoliation volume" is the bulk volume per unit weight of the exfoliated graphite flakes or worms which are formed when the intercalated flakes are exposed to a high temperature.

Intercalated graphite may generally be exfoliated at temperatures greater than about 700° C. Unless otherwise specified, the exfoliation volumes were measured by heating the intercalated graphite flakes in a 900° C. preheated metal crucible over a Bunsen burner flame, and measuring the bulk volume of the resulting exfoliated flakes. The exfoliation volume is generally accepted as a measure of the suitability of exfoliated graphite for producing flexible graphite foil. Materials with low exfoliation volumes tend to produce flexible foil products with low tensile strengths. In commercial practice, an exfoliation volume greater than about 100 cm$^3$/g is generally required to produce a graphite foil having a sufficient tensile strength.

An advantage of the present invention is that a much smaller amount of intercalation solution can be used without any adverse effects on the properties of the product. The much smaller quantity of solution leaves little or no excess intercalation solution on the flakes, which allows elimination of a washing step to remove excess intercalation solution. Further, the present invention not only eliminates the need for washing of the intercalated graphite, but also avoids a serious waste disposal problem that exists with acid-contaminated wash water. Since a much smaller quantity of intercalation solution is used in the method of the invention, there is also a significant savings (typically about 75%) in the quantity of solution used to treat the graphite flakes.

In addition, by intercalating graphite flakes by a preferred method of the invention, the oxidation resistance of flexible graphite foil is improved. Another advantage is that practice of a preferred method of the invention increases the storage life of intercalated graphite.

The present invention contrasts with the prior art methods discussed above. The prior art methods use large excesses of intercalation solution to insure sufficient intercalation of the graphite and an adequate exfoliation volume. This leaves a large excess of intercalation solution upon the flakes to be washed off. As discussed above, the main criteria for measuring the acceptability of intercalated graphite for the production of flexible graphite is the volume of the exfoliated graphite worms. It has been found unexpectedly, that in accordance with the present invention, use of a much smaller quantity o the solution than used in the prior art does not decrease the product quality (i.e the exfoliation volume).

DESCRIPTION OF THE INVENTION

The intercalation solutions of the invention contain oxidizing and intercalation components known in the art. Examples include those containing oxidizing agents and oxidizing mixtures, such as solutions containing nitric acid, potassium chlorate, chromic acid, potassium permanganate, potassium chromate, potassium dichromate, perchloric acid, and the like, or mixtures, such as for example, concentrated nitric acid and chlorate, chromic acid and phosphoric acid, sulfuric acid and nitric acid, or mixtures of a strong organic acid, e.g. trifluoroacetic acid, and a strong oxidizing agent soluble in the organic acid.

In a preferred embodiment of the invention, the solutions are mixtures of sulfuric acid, or sulfuric acid and phosphoric acid, and an oxidizing agent, i.e. nitric acid, perchloric acid, chromic acid, potassium permanganate, hydrogen peroxide, iodic or periodic acids, or the like. Although less preferred, the intercalation solutions of the invention may contain metal halides such as ferric chloride, and ferric chloride mixed with sulfuric acid, or a halide, such as bromine as a solution of bromine and sulfuric acid or bromine in an organic solvent.

The intercalation solutions used in the method of the invention ar preferably concentrated solutions with as little water content as is practical. Generally, solutions having an intercalant concentration of 10 N or greater are suitable. An example of suitable solutions are those currently used in commercial practice of the Shane et al. process, which are usually solutions of concentrated sulfuric acid (>90 wt. % $H_2SO_4$) and concentrated nitric acid (>65 wt. % $HNO_3$). In addition, to having a low water content in the intercalating solution, water should not be added to the solution, or be added to the flakes in an additional step, such as by washing. Excess water increases the difficulty of exfoliating the graphite flakes due to the extra energy required to vaporize the water, and can lower the exfoliation volume, resulting in inferior properties of the flexible graphite foil. A preferred intercalation solution contains between 50% and 92% concentrated sulfuric acid and between 8% and 50% concentrated nitric acid by weight.

The quantity of intercalation solution used in the invention is between 10 and 50 parts solution per hundred parts of graphite by weight (pph). Higher quantities, above about 50 pph, require a washing step because the flakes are too wet with unreacted intercalation solution. Quantities of intercalation solution lower than about 10 pph generally produce unacceptably low exfoliation volumes. Preferably the intercalation solution is used in a quantity less than about 35 pph, since additional quantities above 35 pph do not produce significant improvement in the exfoliation volume. Typically, the amount of intercalation solution is between 15 and 40 pph.

Suitable graphite flakes for use in the method of the invention include the particulate forms of graphite used in the art for making intercalated graphite. These include natural flake or powder graphite. Kish flake graphite, or a synthetic graphite such as heat treated pyrolytic graphite in the form of chips, powder, flakes, or the like.

The graphite flakes are mixed with the intercalation solution by any liquid-solid blending technique which completely disperses the liquid intercalation solution through the solid graphite flake. In addition, the mixing should be gentle, without substantial grinding or attrition of the graphite flakes. Suitable mixers include those used in solid mixing applications, such as tumblers, twin rotor and single rotor blenders, turbine blenders, twin shell or "v" blenders, ribbon blenders, rotary blade mixers, Hobart-type mixers, and vertical screw (orbiting type) mixers such as Nauta mixers.

The intercalation solution may be introduced into the mixer by any suitable means. preferably, the mixer or blender allows the addition of the solution directly in the mixer while the solid graphite is being stirred, such as by spraying or atomizinq the solution directly upon the graphite flakes while being stirred. If a multicomponent intercalation solution is being used, the components may be introduced as a mixed single solution, or be introduced as two or more separate solutions, either simultaneously or staged by adding one subsequent to the other. In the case of separate intercalation solutions, the amount of the intercalation solution is calculated by summing the amounts of each solution added. For example, graphite flakes may be intercalated with sulfuric acid/nitric acid, by first adding 15 pph sulfuric acid, and then subsequently adding the 8 pph nitric acid. The total amount of intercalation solution added is 23 pph. Yet another separate intercalation solution may optionally be added, for example, one containing a phosphate to impart oxidation resistance. An advantage of using a staged or sequential addition of the intercalation solution to the graphite flakes is that reaction of the components while in mixed solutions can be minimized. In addition, staging the introduction of the solutions tends to decrease the amount of agglomeration of the graphite flakes while the are being mixed.

After adding the intercalation solution the blending or mixing action is preferably continued to completely disperse the solution throughout the flakes. The post addition mixing time can be from about ten minutes to several hours, preferably from about 20 to 40 minutes.

As the intercalated flakes of the invention are typically in a damp condition, in order to ease handling and storage of the flakes, they are preferably dried before the flakes are exfoliated to remove moisture and volatile substances remaining upon the flakes. Since the method of the invention requires a minimum amount of solution, drying is not as critical as in the prior art process where the intercalated flakes are thoroughly saturated with unreacted solution. Accordingly, it is also within contemplation of the invention to exfoliate intercalated graphite flakes without an intermediate drying step. The drying is accomplished by heating the intercalated graphite flakes to a temperature between 100° C., and 150° C., preferably about 120° C., for a time sufficient to dry the intercalated flakes, and to remove volatile substances derived from the intercalation solution. Lower temperatures, below about 100° C. are less preferred, however are effective to dry the flakes if a sub-atmospheric pressure is used. The heating time depends on the particular equipment used and the amount of the intercalated flakes dried. Typically the heating time for drying is between about 10 minutes and about 2 hours. If the intercalated graphite flakes are heated for too long of a period, the flakes will degrade and have an insufficient exfoliation volume.

The mixer used to disperse the intercalation solution through the graphite flakes may optionally be equipped with a heater. With the heater, the mixture of intercalation solution and graphite may be dried in the mixer after addition of the solution. In a preferred embodiment of the invention, the graphite flakes are heated to a drying temperature, between 100° C. and 150° C. preferably 120° C., before and during addition and dispersion of the intercalation solution. This dries the flakes as the solution is added and dispersed which lowers the moisture level in the flakes. It also assists in lowering water content of the intercalation solution by removing moisture before the solution can react with the flakes. The pre- and simultaneous heating of the flakes also reduces flake agglomeration and reduces degradation of the exfoliation volume of the flakes due to the tumbling and mixing in the mixer.

The intercalated flakes, either dried or undried, may be exfoliated by conventional means, which involves quickly heating the flakes, typically in a flame, up to a temperature greater than 700° C., preferably greater than 1000° C.

The exfoliated graphite may then be compressed into flexible graphite sheet. Suitable exfoliation methods and methods for compressing the exfoliated graphite flakes into graphite sheet are disclosed in U.S. Pat. No. 3,404,061 to Shane et al., which is hereby incorporated by reference.

Intercalated graphite flakes resistant to deterioration by aging are produced by a preferred practice of the invention, wherein graphite flakes having an ash content greater than 2 wt. % are treated according to the present invention and dried by heating, either simultaneous or subsequent to the addition and dispersion of the solution as described above. An advantage of this preferred practice is that deterioration of the intercalated high-ash graphite flakes due to age is largely eliminated. This allows greater flexibility in the manufacturing process, as no adjustment is required to compensate for the age of the intercalated flakes used for exfoliation. In this preferred process it is particularly important to use concentrated solutions with a low water content, for an additional problem with excessive water in the intercalation solution is that the water will counteract the inhibitive effect on age-deterioration. In this connection, the hygroscopic nature of intercalated flake makes it advisable that storage be maintained in a moisture-free environment.

Graphite foil resistant to oxidation may be produced according to the method of the invention by adding a phosphate as a mixture with other intercalants or as a separate solution. Since no washing step is required, the present method produces no phosphate-containing waste water.

In addition, improved oxidation resistant graphite foil may be produced by a preferred phosphate-free embodiment of the invention. In this embodiment, graphite flakes having an ash content greater than 2 wt. %, are treated with from 10 to 50 pph of intercalation solution, and exfoliated. From the exfoliated flakes, a graphite foil having oxidation resistance superior to that of the prior art is produced.

EXAMPLES

In the following examples, unless noted otherwise, the strength of the sulfuric acid was 96 wt. % $H_2SO_4$, and the strength of the nitric acid was 70 wt. % $HNO_3$. Reference to "pph" of intercalation solution refers to parts by weight of intercalation solution per 100 parts by weight of graphite flakes. The flakes were exfoliated by holding the flakes in a metallic crucible over the flame of a Bunsen burner. The temperature of exfoliation was 900° C.

The graphite flakes used in the examples below were natural graphite flakes. The graphite flakes are referred to as grades "A", "B", "C", which refer to the approximate ash content of the flakes. Grade A flakes are low ash flakes with a maximum ash content of 1 weight percent. Flakes of grades B and C are high ash flakes containing more than 2 weight percent ash. Grade B flakes have a nominal ash content of 6 weight percent, and grade C flakes have nominal ash content of 10 weight percent. Actual ash contents for Grades B and C may vary by as much as 50% from the nominal amount.

In the examples, unless noted otherwise, the intercalation solution was dispersed through the flakes by adding the solution to 20 g of graphite flakes and mixing the solution in the flakes with a spatula for 20 minutes.

Oxidation resistance for flexible graphite foil was determined by placing a one centimeter diameter circular disk of the foil in flowing air at 650° C. for five hours, after which the weight loss of the disk was measured.

Example I

Twenty six pph of an intercalation solution comprising 85 weight percent sulfuric acid and 15 weight percent nitric acid was added to grade C natural graphite flakes and the solution dispersed in the flakes. An exfoliation volume of approximately 195 $cm^3/g$ was obtained. This exfoliation volume compares favorably with exfoliation volumes of 150 to 200 $cm^3/g$ usually obtained in commercial practice of the Shane et al. method. The tensile strength of flexible graphite produced according to the present invention also is comparable to that produced by commercial practice of the Shane et al. method.

Example II

Twenty pph of an intercalation solution composed of 85 wt. % sulfuric acid and 15 wt. % nitric acid by weight was slowly added over a ten minute period to 1000 grams of grade C graphite flakes in a Hobart TM mixer. After the addition of the intercalation solution, the flakes were mixed for an additional 20 minutes. The graphite flakes were then exfoliated to obtain an exfoliation volume of approximately 156 $cm^3/g$. Suitable flexible graphite was prepared using standard rolling techniques.

Example III

Comparative tests were run using an intercalation solution as in Example I, by mixing by hand 20 grams of graphite with the solution. For each test, the amounts of the solution used, and the exfoliation volume of the flakes are shown in Table A;

TABLE A

| | Intercalation Tests | |
|---|---|---|
| Test | Solution Amount (pph) | Exf. Vol. ($cm^3/g$) |
| A-1 | 30 | 297 |
| A-2 | 80 | 306 |
| A-3 | 134 | 210 |

By comparing the test according to the invention, A-1, with tests not according to the invention where an excess of solution was used, A-2, and A-3, it is shown that by using an excess amount of intercalation solution there is no improvement in the exfoliation volume. In addition, the flakes of A-2 and A-3 were soggy and saturated with unreacted solution and would be difficult to exfoliate in commercial production, or alternately, would require washing and drying before exfoliation.

Example IV

Tests were run to determine the effect of aging of graphite flakes intercalated by the method of the invention, and by a prior-art (Shane et al.) method. Test B-1 was run according to the Shane method by treating the flakes with a large excess of intercalation solution, filtering the solution from the flakes, washing the flakes with water, and drying the flakes for 2 hours at 120° C. Tests B-2 to B-10 were run according to the invention by hand mixing samples of graphite flakes and an intercalation solution. For tests B-6 through B-10, the intercalated graphite flakes were dried after intercalation by heating the flakes for 2 hours at 120° C. For tests B-2 through B-5, the flakes were left undried. In test B-6 15 pph water was added to the intercalation solution before treating the flakes. In Table B, below are summarized the results of the tests, showing the grade of flakes, the time aged, the exfoliation volume, the solution amounts, and the composition of the intercalation solution in weight percent of sulfuric and nitric acids.

TABLE B

| | Aging Tests | | | | | |
|---|---|---|---|---|---|---|
| Test | Grade Flake | Time Aged (Days) | Exfoliation Volume ($cm^3/g$) | Solution Amount (pph) | Wt. % $H_2SO_4$ | Wt. % $HNO_3$ |
| B-1 (Shane) | C | 0 | 227 | Large Excess | 85 | 15 |
| | | 3 | 100 | | | |
| B-2 (Un-dried) | B | 0 | 315 | 30 | 80 | 20 |
| | | 35 | 105 | | | |
| B-3 (Un-dried) | C | 1 | 270 | 35 | 85 | 15 |
| | | 85 | 70 | | | |
| B-4 (Un-dried) | C | 1 | 225 | 35 | 75* | 25* |
| | | 9 | 130 | | | |
| B-5 (Un-dried) | A | 1 | 275 | 35 | 85 | 15 |
| | | 70 | 270 | | | |
| B-6 (Dried) | C | 1 | 160 | 35 | 85** | 15** |
| | | 8 | 75 | | | |
| B-7 (Dried) | C | 0 | 220 | 40 | 75 | 25 |
| | | 17 | 240 | | | |
| B-8 (Dried) | B | 0 | 280 | 30 | 80 | 20 |
| | | 54 | 260 | | | |
| B-9 (Dreid) | C | 0 | 220 | 40 | 75 | 25 |
| | | 18 | 240 | | | |
| B-10 (Dried) | B | 1 | 285 | 40 | 80 | 20 |
| | | 55 | 270 | | | |

*Acid Strengths = 94 wt. % $H_2SO_4$, and 67 wt. % $HNO_3$.
**15 pph $H_2O$ (based on the acid weight) was added to the intercalation solution.

As evident from the above results, graphite flakes treated and dried according to the prior-art Shane et al. method (Test B-1) show marked deterioration of exfoliation volume due to aging. The tests according to the invention where the graphite flakes were not dried after treatment, also show deterioration due to aging (Tests B-2 to B-4), except where low ash flakes are treated (Test B-5). Where the graphite flakes were treated according to a preferred embodiment the invention, wherein high ash intercalated flakes are dried, the deterioration due to aging was virtually eliminated (Tests B-7 through B-10). Test B-6 demonstrates the importance of maintaining a low this test, water was added to the intercalation solution and the flakes showed deterioration due to aging, even though the flakes were treated and dried according to the invention.

Example V

This example illustrates an oxidation resistant flexible graphite foil produced by practice of the invention. Oxidation-resistant flexible graphite foil was prepared by adding 40 pph of intercalation solution composed of 76 wt. % sulfuric acid, 19 wt. % nitric acid, and 5 wt. % phosphoric acid to 20 grams of grade B graphite flakes. After mixing for 20 minutes, the flakes allowed to age for two hours and then were exfoliated. An exfoliation volume of 254 $cm^3/g$ was obtained. The flexible graphite made from exfoliated samples was tested for oxidation resistance, and a weight loss of 14.6% was obtained.

Example VI

Intercalated graphite samples were produced by the method of the invention by intercalating graphite flakes with differing ash contents with an intercalation solution of 80 wt. % sulfuric acid, and 20 wt. % nitric acid. The flakes were exfoliated and the exfoliation volume determined. The exfoliated flakes were compressed into a flexible graphite sheet, and the oxidation resistance was measured. The grade of the graphite flakes, the exfoliation volume, and the oxidation loss are summarized below in Table C. Samples C-1, C-2, and C-3 were treated with 30, 30, and 40 pph intercalation solution, respectively.

Comparative samples of intercalated graphite were also made by the Shane et al. method by adding 2 grams of graphite flakes to a great excess (50 ml) of intercalation solution and mixing for one minute. The intercalated flakes were then filtered, leaving approximately 110 pph acid on the flakes, and thereafter washed with two 75 ml aliquots of water to remove the excess acid. The washed flakes were dried for two hours at 120° C. The data for these samples is summarized in Table D below;

TABLE C

| | Method of the Invention | | |
|---|---|---|---|
| Sample | Grade Flake | Exf. Vol. ($cm^3/g$) | Oxidation Loss (%) |
| C-1 | A | 352 | 64.0 |
| C-2 | B | 328 | 23.5 |
| C-3 | C | 255 | 27.2 |

TABLE D

| | Method of the Prior Art | | |
|---|---|---|---|
| Sample | Grade Flake | Exf. Vol. ($cm^3/g$) | Oxidation Loss (%) |
| D-1 | A | 227 | 64.8 |
| D-2 | B | 339 | 30.0 |
| D-3 | C | 318 | 30.0 |

The results shown in Tables C and D demonstrate that for flexible foil produced from the high ash natural graphite flakes (Grades B and C), the oxidation resistance can be improved by 10 to 20% by practice of the invention, without the use of phosphate in the intercalation solution.

Example VII

Comparative samples of intercalated graphite were produced according to the invention, and according to a prior art method as in Example VI, except the intercalation solution was 76 wt. % sulfuric acid, 19 wt. % nitric acid, and 5 wt. % phosphoric acid, a known graphite oxidation inhibitor. The results are summarized in Tables E and F. Samples E-1, E-2, and E-3 were treated with 40 pph each.

TABLE E

| | Method of Invention w/Phosphates | | |
|---|---|---|---|
| Sample | Grade Flake | Exf. Vol. ($cm^3/g$) | Oxidation Loss (%) |
| E-1 | A | 188 | 4.9 |
| E-2 | B | 254 | 14.6 |
| E-3 | C | 196 | 15.5 |

TABLE F

| | Method of Prior Art w/Phosphate | | |
|---|---|---|---|
| Sample | Grade Flake | Exf. Vol. ($cm^3/g$) | Oxidation Loss (%) |
| F-1 | A | 196 | 8.2 |
| F-2 | B | 293 | 19.8 |
| F-3 | C | 173 | 19.3 |

The data in Tables E and F show that by practice of the invention, the oxidation resistance of flexible graphite foil is further improved.

Example VIII

Intercalated graphite was made by the method of the invention using pilot scale mixing equipment. Intercalated graphite was made by adding 135 pounds of flakes to a Nauta mixer with a 3.3 cubic foot capacity, and dry blending the flakes for 1 minute, after which 30 pph of intercalation solution were added by spraying over the graphite flakes over a mixing period of 14 minutes. After the addition of the intercalation solution to the graphite flakes, mixing was continued for 15 minutes.

Example IX

This example shows the practice of the invention using a solution containing an oxidizing agent other than nitric acid. 36 pph of sulfuric acid (strength=98 wt. % $H_2SO_4$) was added to 20 grams of grade A low ash graphite flakes and mixed for ten minutes. Then 4 pph of hydrogen peroxide (strength=70 wt. % $H_2O_2$) were added and mixed for 10 minutes. After further mixing for a total of 30 minutes of mixing, the flakes were exfoliated in the flame of a Bunsen burner at 900° C., and the exfoliated flakes were rolled into flexible graphite. The sulfuric acid and the hydrogen peroxide were added separately since mixtures of sulfuric acid and hydrogen peroxide were unstable. An acceptable exfoliation volume of 187 cm$^3$/g was obtained. The use of higher ash containing natural graphite flakes with hydrogen peroxide makes the process more difficult because of the catalytic decomposition of the hydrogen peroxide by metals contained in the ash.

Example X

This example illustrates the invention. Several tests were run by placing 1000 g of natural graphite flakes in a Hobart TM mixer. The mixer was equipped with an internal sprayer for applying solution over the flake while the mixer was operating. The mixer was also equipped with an electrical resistance heater to heat the graphite flakes within the mixer.

After the mixer was turned on and the graphite flakes were blended for 1 minute, a mixed solution of sulfuric acid and nitric acid was metered in through the sprayer upon the graphite. In tests G-2 and G-3, the heater was operated during the addition of the solution to provide a temperature between 100° C. and 150° C. (>100), while in test G 1 the heater was not operated and the mixing was at room temperature (RT), about 20° C.

In Table G below is summarized the results of the tests. Shown is the grade of the graphite flakes, the amount of intercalation solution used, the weight ratio of sulfuric acid to nitric acid, the temperature, the rate in which the solution was metered into the mixer, the length of time over which the solution was added, the time mixed after solution addition, and the exfoliation volume of the intercalated flake. The post mix time for each test was 5 minutes, and the solution addition rate was 4.6 pph/min for tests G-1 and G-3, and 4.5 pph/min for test G-2.

TABLE G

| | | Intercalation Tests | | | | |
|---|---|---|---|---|---|---|
| Test No. | Grade Flake | Solution Amount (pph) | H$_2$SO$_4$/ HNO$_3$ | Temp. (°C.) | Post Mix Time (min) | Exfol. Vol. (g/cm$^3$) |
| G-1 | C | 23 | 15:8 | RT | 5 | 172 |
| G-2 | C | 23 | 15:8 | >100 | 5 | 180 |
| G-3 | B | 23 | 15:12 | >100 | 5 | 175 |

Example XI

Into the mixer of Example X, 250 grams of grade B graphite flakes were placed and heated to 128° C. Over a period of 15 minutes, 35 pph of an intercalation solution (75 wt. %, and 25 wt. %) were added to the flakes while the mixer was mixing the flakes. After addition of the intercalation solution, the treated flakes were mixed for 15 minutes. The final temperature was 148° C. The exfoliation volume of the intercalated flakes was determined as 185 cm$^3$/g.

While this invention has been described with reference to certain specific embodiments and examples, it will be recognized by those skilled in the art that many variations are possible without departing from the scope and spirit of the invention, and that the invention, as described by the claims, is intended to cover all changes and modifications of the invention which do not depart from the spirit of the invention.

What is claimed is:

1. A method for intercalating graphite flakes which comprises;
   (a) adding liquid intercalation solution to graphite flakes in an amount of between 10 and 35 parts by weight of solution per 100 parts by weight of graphite flakes, the liquid intercalation solution comprising one or more members selected from the group consisting of nitric acid, sulfuric acid, potassium chlorate, chromic acid, potassium permangante, potassium chromate, potassium dichromate, perchloric acid, hydrogen peroxide, iodic acids, periodic acids, ferric chloride, and halides, and
   (d) dispersing the intercalation solution through the graphite flakes to produce intercalated graphite flakes, the intercalated graphite flakes having an exfoliation volume greater than about 100 cm$^3$/g when passed directly to exfoliation.

2. The method of claim 1 wherein the intercalation solution comprises one or more members selected from the group consisting of nitric acid, sulfuric acid, perchloric acid, chromic acid, potassium permanganate, hydrogen peroxide, iodic acids, and periodic acids.

3. The method of claim 2 wherein the intercalation solution additionally comprises a phosphate.

4. The method of claim 1 wherein the intercalation solution additionally comprises a phosphate.

5. The method of claim 1 wherein the intercalation solution comprises between 50% and 92% sulfuric acid and between 8% and 50% nitric acid by weight.

6. The method of claim 1 wherein the intercalation solution comprises hydrogen peroxide.

7. The method of claim 1 wherein after step (b) the intercalated graphite flakes are heated to a temperature between 100° C. and 150° C.

8. The method of claim 1 wherein the intercalated graphite flakes are heated to a temperature between 100° C. and 150° C. during the addition and dispersion of the intercalation solution.

9. The method of claim 7 wherein the graphite flakes in step (a) contain less than 2 weight percent ash.

10. The method of claim 1, wherein the intercalation solution comprises more than one component, and the components are added to the graphite flakes sequentially.

11. The method of claim 10, wherein the graphite flakes are heated to a temperature between 100 and 150° C. during the sequential addition of the components of the intercalation solution.

12. The method of claim 1 wherein the intercalation solution comprises sulfuric acid, and nitric acid.

13. The method of claim 1 wherein the intercalation solution comprises sulfuric acid, nitric acid, and a phosphate.

14. A method for forming exfoliated graphite flakes which comprises;
   (a) adding liquid intercalation solution to graphite flakes in an amount of between 10 and 35 parts by weight of solution per 100 parts by weight of graphite flakes, the liquid intercalation solution comprising one or more members selected from the group consisting of nitric acid, sulfuric acid, potassium chlorate, chromic acid, potassium permanganate, potassium chromate, potassium dichromate, perchloric acid, hydrogen peroxide, iodic acids, periodic acids, ferric chloride, and halides,
   (b) dispersing the interaction solution through the graphite flakes to produce intercalated graphite flakes, and
   (c) exfoliating the intercalated graphite flakes directly after step (b) to produce exfoliated graphite flakes having an exfoliation volume greater than 100 cm$^3$/g.

15. The method of claim 14 wherein the exfoliation in step (c) is conducted at a temperature greater than 700° C.

16. The method of claim 14 wherein the exfoliation in step (c) is conducted at a temperature greater than 1000° C.

17. The method of claim 15 wherein the exfoliated flakes are compressed to form a flexible foil.

18. The method of claim 17 wherein the graphite flakes in step (a) contain less than 2 weight percent ash.

* * * * *

UNITED STATES PATENT AND TRADEMARK OFFICE
CERTIFICATE OF CORRECTION

PATENT NO. : 4,895,713
DATED : January 23, 1990
INVENTOR(S) : Ronald A. Greinke, Robert A. Mercuri, and Edgar J. Beck It is certified that error appears in the above-identified patent and that said Letters Patent is hereby corrected as shown below:

Column 4, line 7, delete "o" and substitute therefor --of--.

Column 4, line 35, delete "ar" and substitute therefor --are--.

Column 5, line 17, delete "preferably" and substitute therefor --Preferably--.

Column 5, line 41, delete "the" and substitute therefor --they--.

Column 6, line 10, insert a comma after the second occurrence of "C.".

Column 8, line 63, delete "(Dreid)" and substitute therefor --(Dried)--.

Column 9, line 13, after "low", insert --water content in the intercalation solution. In--.

Column 12, line 8, delete "gante" and substitute therefor --ganate--.

Signed and Sealed this

Nineteenth Day of February, 1991

Attest:

HARRY F. MANBECK, JR.

*Attesting Officer*  *Commissioner of Patents and Trademarks*